United States Patent [19]

Matsumoto

[11] Patent Number: 5,446,514
[45] Date of Patent: Aug. 29, 1995

[54] SHUTTER BLADES DRIVE MECHANISM FOR PHOTOGRAPHIC CAMERAS

[75] Inventor: Junichi Matsumoto, Tokyo, Japan
[73] Assignee: Copal Company Limited, Japan
[21] Appl. No.: 177,248
[22] Filed: Jan. 4, 1994

[30] Foreign Application Priority Data

Jan. 11, 1993 [JP] Japan ............... 5-000388 U

[51] Int. Cl.6 ............... G03B 9/08
[52] U.S. Cl. ............... 354/234.1
[58] Field of Search ........... 354/435, 439, 440, 234.1, 354/258.1

[56] References Cited

U.S. PATENT DOCUMENTS 5,258,797 11/1993 Oyoshi et al. ............... 354/234.1 X

FOREIGN PATENT DOCUMENTS 63-70233 3/1988 Japan .
3-71328 7/1991 Japan .

Primary Examiner—Howard B. Blankenship
Attorney, Agent, or Firm—Graham & James

[57] ABSTRACT

A shutter blades opening and closing lever is biased by a spring in a direction to open shutter blades. A pin made of a soft magnetic material is built in a motor which consists of a stator having a coil wound therearound and a magnet rotor. An operation to open the shutter blades opening and closing lever is performed by the spring, whereas another operation to close the shutter blades opening and closing lever is performed by a driving pin which is integrated with the magnet rotor. In a condition where the shutter blades are closed, the shutter blades opening and closing lever is kept at a standard position thereof, against resilience of the spring, by utilizing a magnetic attractive force exerted between the pin made of the soft magnetic material and the magnet rotor.

5 Claims, 5 Drawing Sheets

SHUTTER BLADES DRIVE MECHANISM FOR PHOTOGRAPHIC CAMERAS

BACKGROUND OF THE INVENTION a) Field of the Invention

The present invention relates to a shutter blades drive mechanism for photographic cameras which functions to drive shutter blades by using a motor comprising a magnet rotor allowed to rotate only within a predetermined angular range in a normal direction or another direction reverse thereto dependently on a direction of an electric current supplied to a coil.

b) Description of the Prior Art

As exemplified by the shutter blades drive mechanisms disclosed by U.S. Pat. No. 5,258,797 and Japanese Utility Model Preliminary Publication No. Hei 3-71328, there is known a shutter blades drive mechanism comprising a driving pin which is structured integrally with the magnet rotor and rotates together with the magnet rotor in the normal direction or the reverse direction; a shutter blades opening and closing lever which is biased by a spring in a direction to open the shutter blades; and a latch lever which engages with the shutter blades opening and closing lever at a position to close the shutter blades.

The shutter blades drive mechanism of such a type is configured so as to perform an operation for opening the shutter blades by disengaging the latch lever when the driving pin is shifted in the normal direction and another operation for closing the shutter blades by pushing the shutter blades opening and closing lever when the driving pin is shifted in the reverse direction. In a condition where the shutter blades are closed, the magnet rotor maintains itself at a stationary position with a magnetic force of itself. Therefore, the shutter blades drive mechanism of this type poses a problem that it allows the magnet rotor to be rotated until the latch lever is pushed by the driving pin when an impact is applied to a camera, thereby causing the disengagement of the shutter blades opening and closing lever.

Further, there is known another shutter blades drive mechanism which is of the type described above, but in which the shutter blades opening and closing lever is biased by a spring in a direction to close the shutter blades. In case of this shutter blades drive mechanism, however, the driving pin charges the spring at a process to open the shutter blades. Accordingly, the operation for opening the shutter blades is easily influenced by the spring when it has high resilience, whereby a time required of the operation for opening the shutter blades becomes unstable. Since an exposure time control circuit is triggered at an initial stage of the operation for opening the shutter blades in order to control a time until the operation for closing the shutter blades start, the instability of the time required of the operation for opening the shutter blades makes it impossible to precisely control an exposure time.

SUMMARY OF THE INVENTION

A primary object of the present invention is to provide a shutter blades drive mechanism for photographic cameras which is configured so as not to allow the magnet rotor of the motor to be rotated or so as to prevent the shutter blades from being opened even when an impact is applied to a camera in a condition where the shutter blades are closed.

Another object of the present invention is to provide a shutter blades drive mechanism for photographic cameras which is configured so as to be capable of comprising a means for securely keeping shutter blades in closed positions thereof without requiring a particular space.

The shutter blades drive mechanism for photographic cameras according to the present invention comprises: a shutter blades opening and closing means which reciprocally moves for opening and closing an exposure aperture with the shutter blades, and is biased by a spring in a direction to open the exposure aperture; a motor which consists of a magnet rotor allowed to rotate within a predetermined angular range in a normal direction or a direction reverse thereto dependently on an electric current supplied to a coil and a stator having the coil wound therearound; a driving means which is structured integrally with the magnet rotor, and configured so as to allow the shutter blades opening and closing means to perform an opening operation by utilizing resilience of the spring when the magnet rotor is rotated in the normal direction from a standard position thereof and a closing operation against the resilience of the spring when the magnet rotor is rotated in the reverse direction toward the standard position thereof; and a magnetic means which is disposed at such a location as to exert a magnetic attractive force between the magnet rotor and the magnetic means itself, and functions to keep the shutter blades opening and closing means at a position to close the shutter blades against the resilience of the spring while no electric current is supplied to the coil.

From a viewpoint of a space to be occupied by the shutter blades drive mechanism, it is advantageous to dispose the magnetic means in the motor at such a location as to oppose to a circumferential surface of the magnet rotor.

These and other objects as well as the features and the advantages of the present invention will become apparent from the following detailed description of the preferred embodiments when taken in conjunction with the accompanying drawings.

DETAILED DESCRIPTION OF THE PREFERRED EMBODIMENTS

Figure 1:
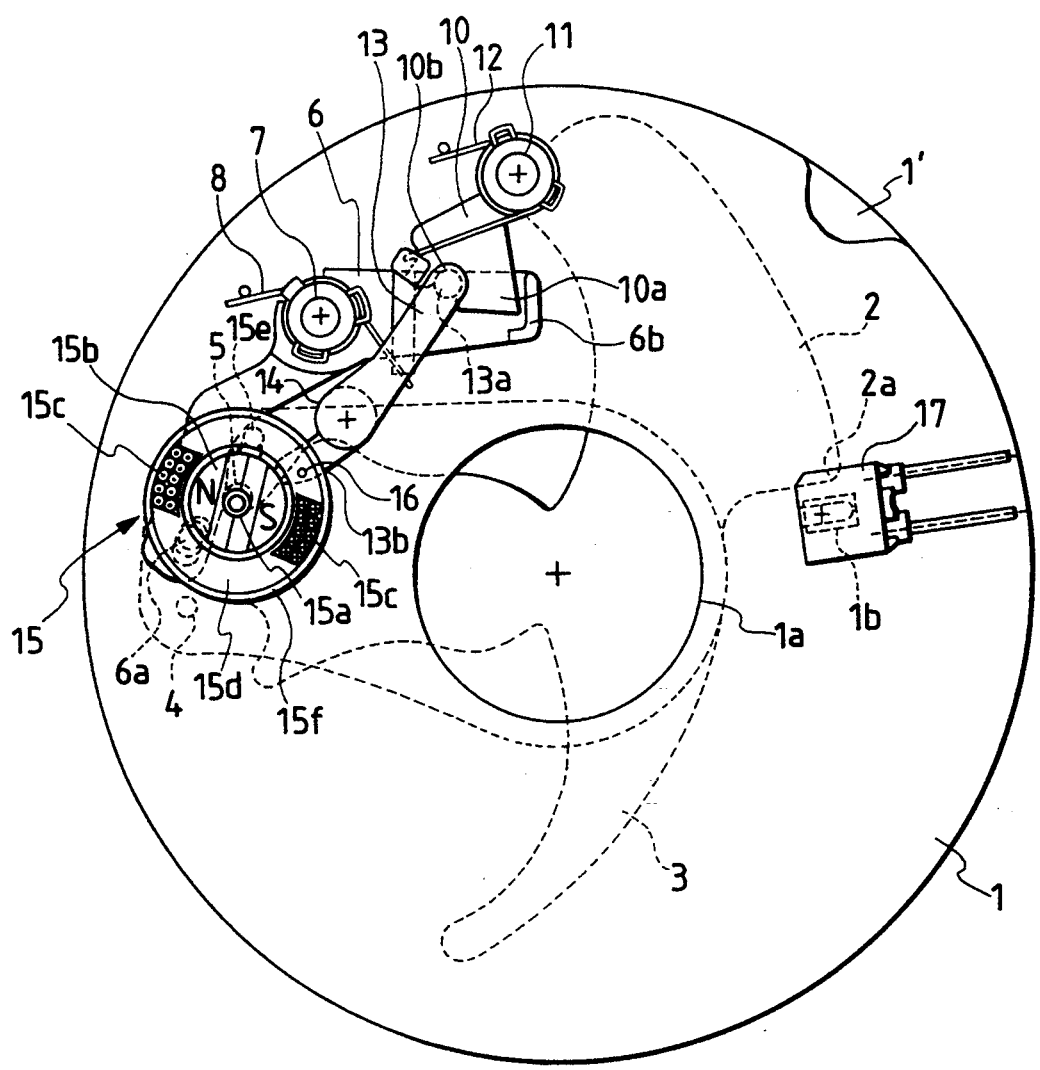
FIG. 1 is a front view illustrating a first embodiment of the shutter blades drive mechanism for photographic cameras according to the present invention in a condition where the shutter blades are closed.
Figure 2:
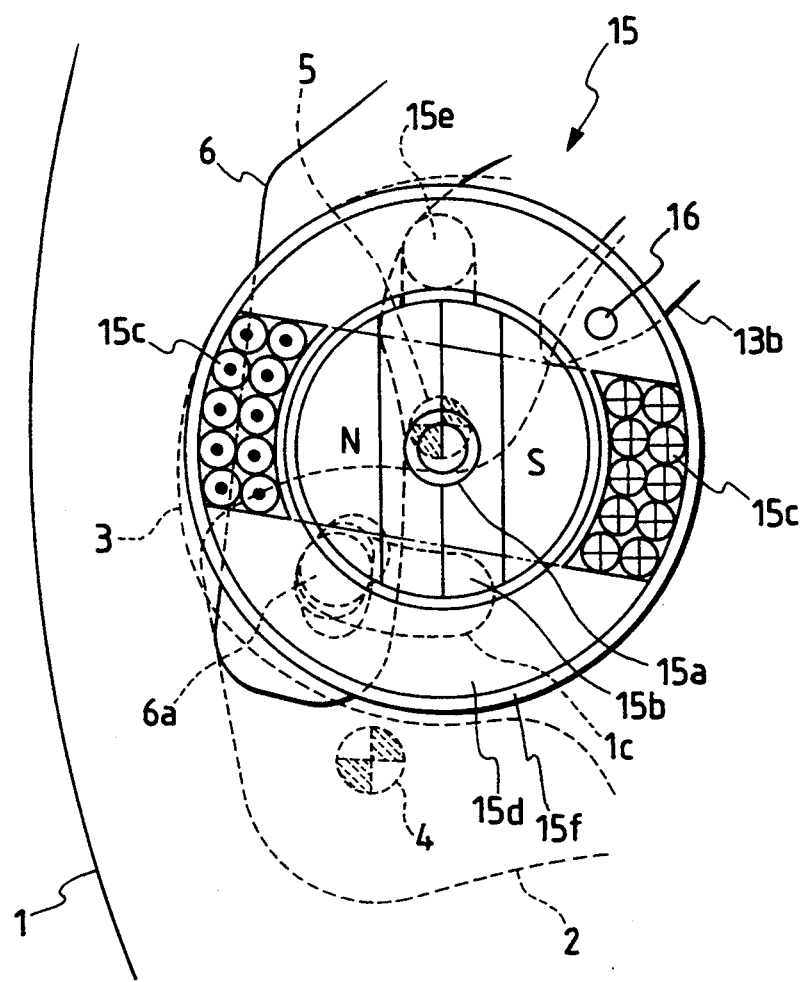
FIG. 2 is a diagram illustrating a portion of FIG. 1 on an enlarged scale.

First, the first embodiment of the shutter blades drive mechanism according to the present invention will be described with reference to FIG. 1 through FIG. 3. In these drawings, the reference numeral 1 represents a base plate in which an exposure aperture 1a, slots 1b and 1c are formed. A blades chamber is formed between the base plate 1 and a cover plate 1', and shutter blades 2 and 3 are pivoted by shafts 4 and 5 respectively which are studded on the base plate 1. An end surface 2a is formed on the shutter blade 2. A shutter blades opening and closing lever 6 which has a pin 6a and an engaging portion 6b is pivoted by a shaft 7 studded on the base plate 1, and biased counterclockwise by resilience of a spring 8. The pin 6a runs throughout the slot 1c, and is inserted into slots which are formed in a shutter blades 2 and 3 respectively as shown in FIG. 2.

A latch lever 10 which has a latch portion 10a and a fork portion 10b is pivoted by a shaft 11 studded on the base plate 1, and biased counterclockwise by a spring 12. An intermediate lever 13 which has a pin 13a to be fitted into the fork portion 10b and an arm 13b is pivoted by a shaft 14 studded in the base plate 1.

A motor 15 which comprises a magnet rotor 15b having a rotating shaft 15a and a stator 15d having a coil 15c wound therearound is mounted on the base plate 1 in an ordinary manner (not shown). The magnet rotor 15b consists of a permanent magnet which has two poles and is magnetized in a horizontal direction. Formed in the stator 15d is a slender slot which has a circular section and extends in parallel with the rotating shaft 15a, and a pin 16 made of a soft magnetic material is inserted into the slender slot and fixed therein. A driving pin 15e is structured integrally with the magnet rotor 15b so as to be engageable with both the shutter blades opening and closing lever 6 and the intermediate lever 13. A yoke 15f is fixed to the stator 15d. A photosensor 17 is fixed to the base plate 1 for detecting the end surface 2a, at a process to open the shutter blade 2, for allowing an exposure time control circuit (not shown) to start counting a predetermined time.

Now, description will be made of functions of the first embodiment which has the configuration described above. When an electric current is supplied through the coil 15c in the normal direction upon releasing a shutter on a camera which uses the shutter blades drive mechanism, the magnet rotor 15b starts rotating clockwise in FIG. 1. The shutter blades opening and closing lever 6 turns counterclockwise accordingly, but the engaging portion 6b engages with the latch portion 10a of the latch lever 10, thereby stopping the shutter blades opening and closing lever 6 immediately. In this condition, the exposure aperture 1a has not yet been opened by the shutter blades 2 and 3. The magnet rotor 15b goes on rotating until the driving pin 15e pushes the arm 13b of the intermediate lever 13. The intermediate lever 13 turns the latch lever 10 clockwise against the resilience of the spring 12, thereby disengaging the latch portion 10a from the engaging portion 6b. As a result, the shutter blades opening and closing lever 6 is turned counterclockwise once again by the resilience of the spring 8, thereby opening the shutter blades 2 and 3 by using the pin 6a. At this process to open the shutter blades 2 and 3, the photosensor 17 detects the end surface 2a of the shutter blade 2 for triggering the exposure time control circuit. FIG. 3 shows a condition where the shutter blades 2 and 3 have been fully opened by the functions described above.

The moment that the exposure time control circuit terminates the counting of the predetermined exposure time, and electric current flows through the coil 15c in the direction reverse to the normal direction described above. Accordingly, the magnet rotor 15b is rotated counterclockwise in FIG. 3, whereby the driving pin 15e turns the shutter blades opening and closing lever 6 clockwise against the resilience of the spring 8. At this process to close the shutter blades, the magnetic attractive force exerted between the magnet rotor 15b and the pin 16 serves for assisting the driving force of the magnet rotor 15b. The shutter blades 2 and 3 are closed by the pin 6a as described above and reach the positions shown in FIG. 1.

Figure 3:
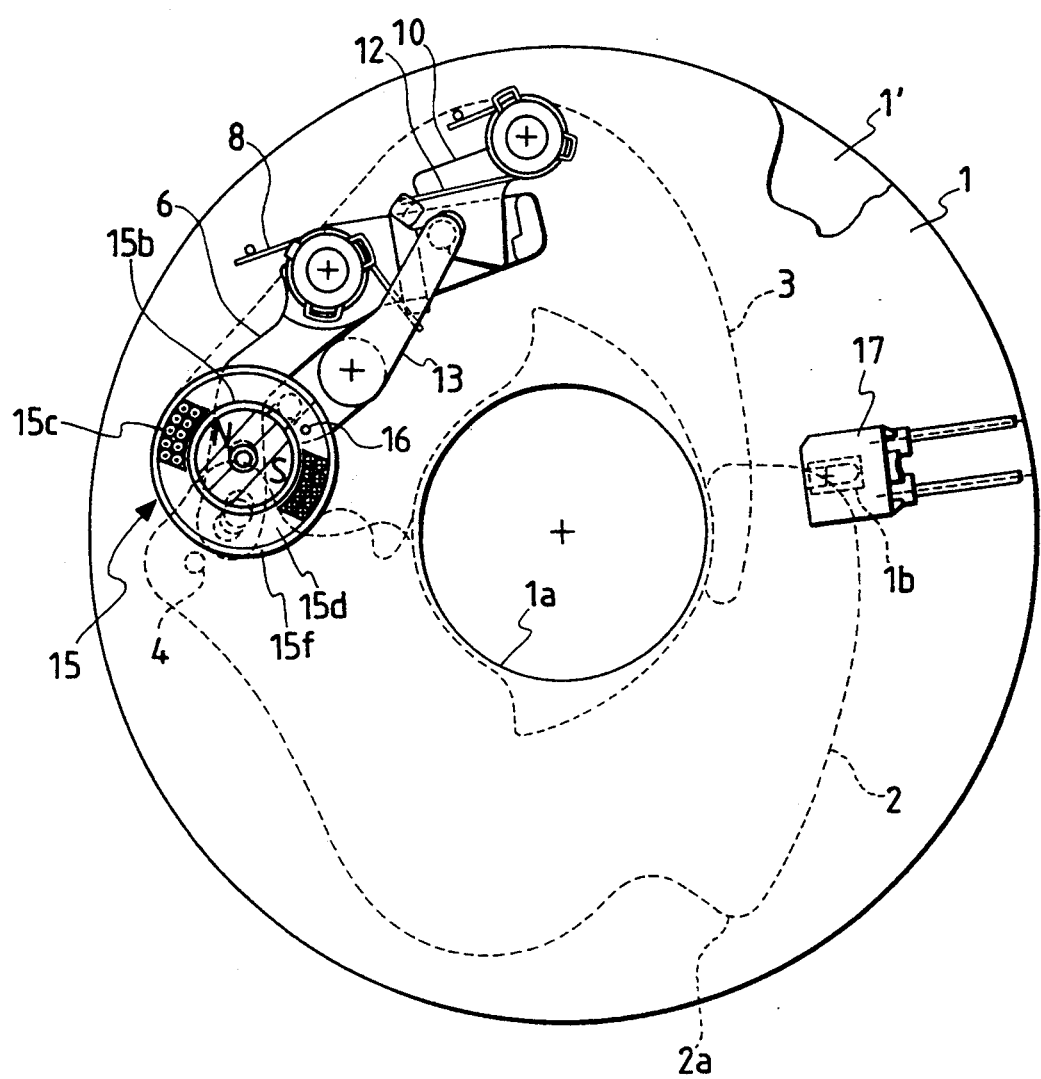
FIG. 3 is a front view illustrating the first embodiment of the present invention in another condition where the shutter blades are opened.

When an object to be photographed has high luminance, the exposure time control circuit terminates counting before the shutter blades 2 and 3 reach the fully opened positions thereof shown in FIG. 3. In this case, the electric current flowing in the reverse direction is supplied, upon termination of the counting, to the coil 15c for rotating the magnet rotor 15b counterclockwise. Accordingly, the shutter blades opening and closing lever 6 is turned clockwise by the driving pin 15e against the resilience of the spring 8 before it fully opens the shutter blades 2 and 3, whereby the shutter blades 2 and 3 are closed, and set at the positions shown in FIG. 1.

In the condition where the shutter blades 2 and 3 are closed, the shutter blades opening and closing lever 6 is kept stopped owing to the function of the pin 6a which is engaged with the slot 1c as is seen from FIG. 2. Even when the electric current stops flowing to the coil 15c in this condition, the shutter blades opening and closing lever 6 cannot be turned counterclockwise by the resilience of the spring 8 since the pin 16 which is made of the soft magnetic material attracts an S pole of the magnet rotor 15b so as to rotate it counterclockwise with a force stronger than the resilience of the spring 8. As a result, the magnet rotor 15b cannot be rotated clockwise owing to the above-mentioned magnetic attractive force even when an impact is applied to the camera which uses the shutter blades drive mechanism. Should an abnormally strong force act to rotate the magnet rotor 15b clockwise, the shutter blades opening and closing lever 6 is latched by the latch lever 10 before the shutter blades 2 and 3 open the exposure aperture 1a, and then returns to the position shown in FIG. 1.

Figure 4:
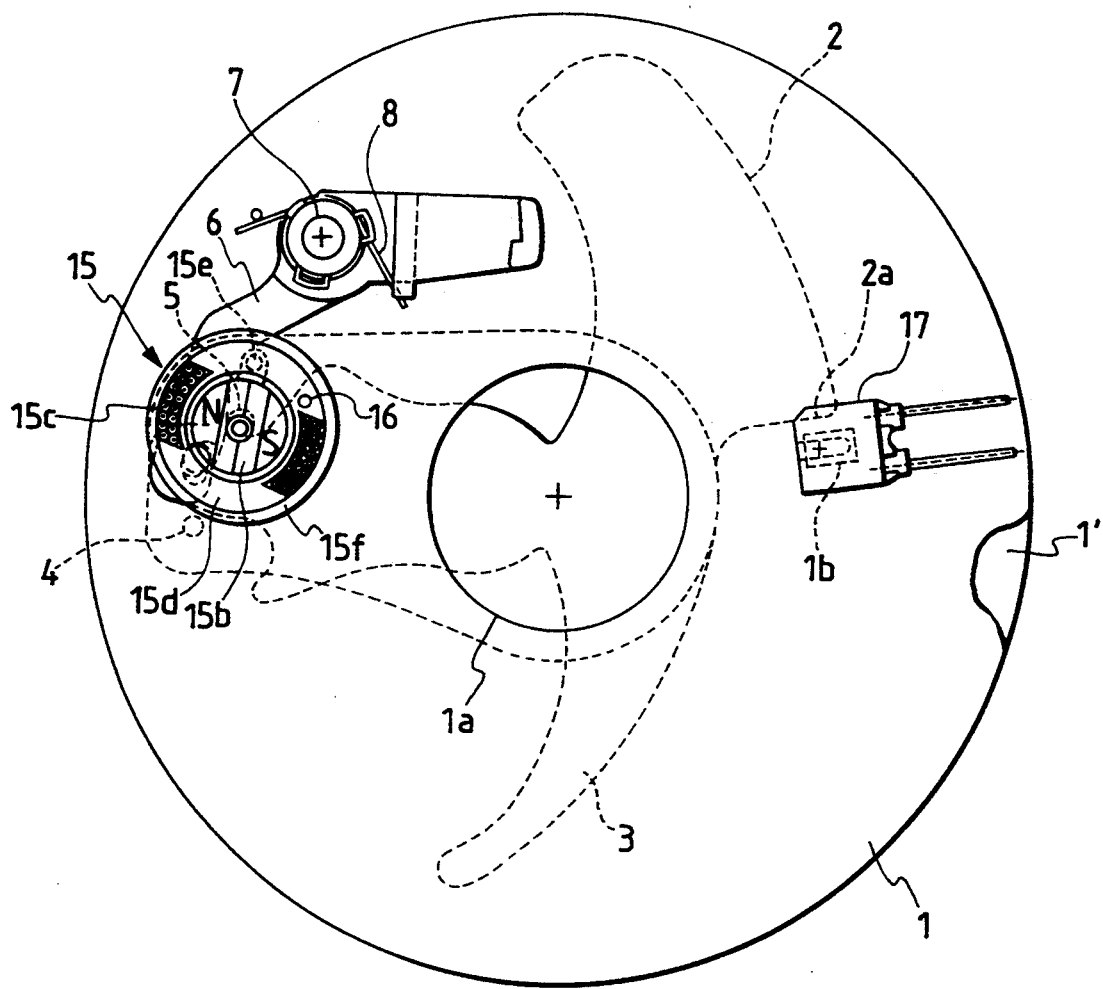
FIG. 4 is a front view illustrating a second embodiment of the shutter blades drive mechanism according to the present invention in a condition where the shutter blades are closed.
Figure 5:
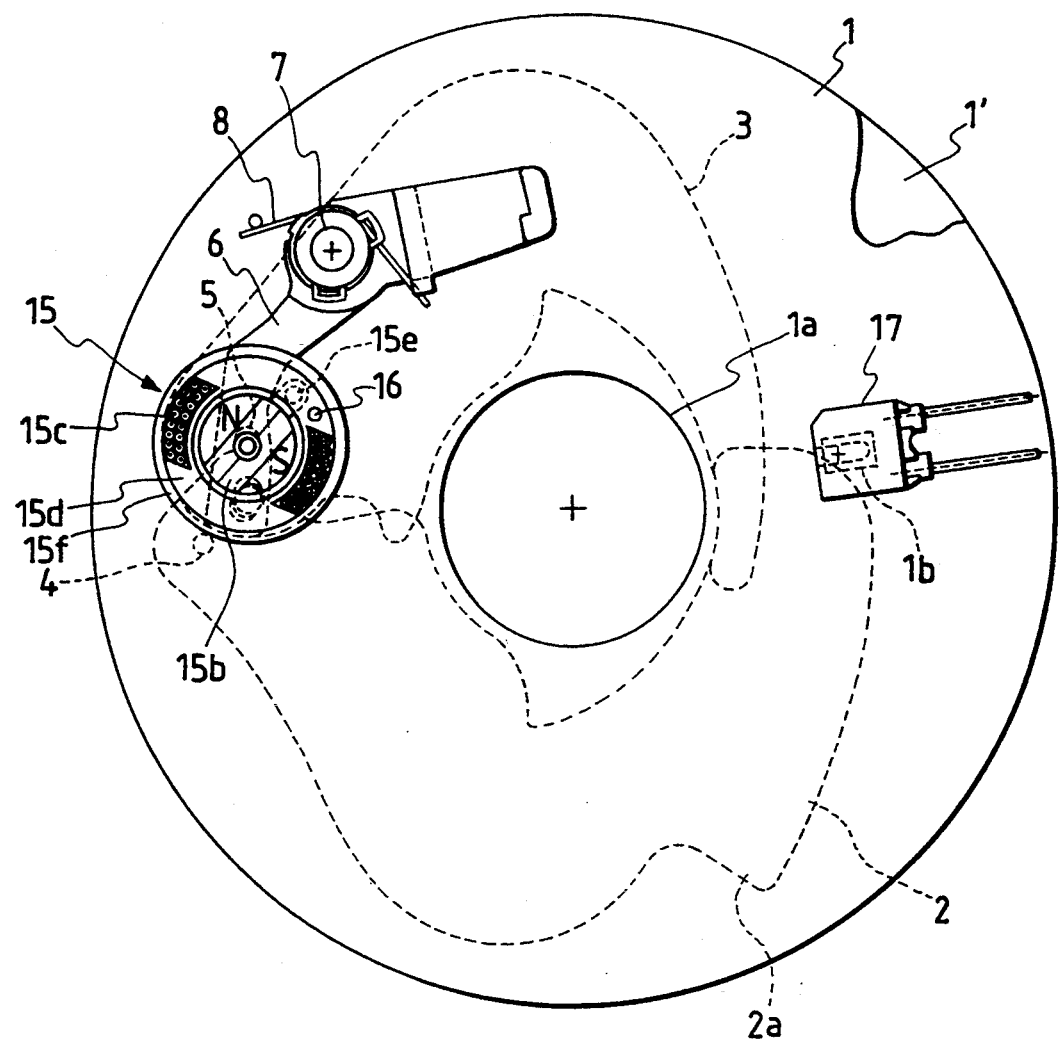
FIG. 5 is a front view illustrating the second embodiment of the present invention in another condition where the shutter blades are opened.

Now, the second embodiment of the shutter blades drive mechanism according to the present invention will be described with reference to FIG. 4 and FIG. 5. Parts of the second embodiment which are the same as those of the first embodiment will be represented by reference numerals which are the same as those used for describing the first embodiment. Unlike the first embodiment described above, the second embodiment does not use the latch lever 10, the spring 12 and the intermediate lever 13 which are adopted in the first embodiment. In the second embodiment, a magnetic attractive force which is sufficiently stronger than the resilience of the spring 8 is imparted to the pin 16 functioning to rotate the magnet rotor 15b counterclockwise in the condition where the shutter blades 2 and 3 are closed so that the shutter blades opening and closing lever 6 will not allow the shutter blades 2 and 3 to be opened however strong an impact is applied to the camera using the shutter blades drive mechanism.

Description will be made below of functions the second embodiment which has the configuration described above. When an electric current is supplied through the coil 15c in the normal direction in FIG. 4 upon releasing a shutter on the camera which uses the shutter blades drive mechanism, the magnet rotor 15b rotates clockwise while overcoming the magnetic attractive force exerted by the pin 16. Though the shutter blades opening and closing lever 6 starts turning due to the resilience of the spring 8 at this stage, the driving pin 15e gives no influence on the opening operation of the shutter blades opening and closing lever 6 since the magnet rotor 15b rotates at a speed which is sufficiently higher than the turning speed of the shutter blades opening and closing lever 6. FIG. 5 shows a condition where the shutter blades 2 and 3 have reached the fully open positions thereof owing to the functions described above.

The moment that the exposure time control circuit terminates counting a predetermined exposure time, an electric current flows through the coil 15c in the direction reverse to the normal direction described above. Accordingly, the magnet rotor 15b is rotated counterclockwise in FIG. 5 and the driving pin 15e turns the shutter blades opening and closing lever 6 clockwise against the resilience of the spring 8. The magnetic attractive force exerted between the magnet rotor 15b and the pin 16 serves for assisting the driving force of the magnet rotor 15b at the process to close the shutter blades 2 and 3. Owing to the magnetic attractive force which is stronger than that selected for the first embodiment, the shutter blades opening and closing lever 6 has a closing function more stable than that obtained in the first embodiment. Subsequently, the shutter blades 2 and 3 are set in closed conditions shown in FIG. 4, and the driving pin 15e keeps the shutter blades opening and closing lever 6 with a magnetic attractive force stronger than that obtained in the first embodiment even after the electric current is not supplied any longer to the coil 15c. As a result, the shutter blades 2 and 3 will not open the exposure aperture 1a even when a strong impact is applied to the camera which uses the shutter blades drive mechanism.

What is claimed is:

1. A shutter blades drive mechanism for photographic cameras comprising:
    a shutter blades opening and closing means functioning, by reciprocal movements thereof, to allow shutter blades to open and close an exposure aperture, and biased by a spring in a direction to open said exposure aperture;
    a motor consisting of a magnet rotor and a stator having a coil wound therearound, said magnet rotor being allowed to rotate within a predetermined angular range in a normal direction and reverse direction dependent on the direction of electric current flowing through said coil;
    a driving means structured integrally with said magnet rotor, allowing said shutter blades opening and closing means to be turned by resilience of said spring for opening said shutter blades when said magnet rotor rotates in the normal direction from a standard position thereof, and allowing said shutter blades opening and closing means to turn against the resilience of said spring for closing said shutter blades when said magnet rotor rotates in the reverse direction toward said standard position thereof; and
    a magnetic means disposed at such a location as to exert a magnetic attractive force to said magnet rotor, said magnetic attractive force being larger than the resilience of said spring and smaller than a force to rotate said magnetic rotor derived from the electric current flowing through said coil, thereby functioning to keep said shutter blades opening and closing means at a closed position thereof against the resilience of said spring while no electric current flows through said coil and to allow said magnetic rotor to rotate in accordance with the force derived from the electric current flowing through said coil when the electric current flows through said coil.

2. A shutter blades drive mechanism for photographic cameras according to claim 1 wherein said magnetic means is built in said motor at such a location as to be opposed to a circumferential surface of said magnet rotor.

3. A shutter blades drive mechanism for photographic cameras according to claim 2 wherein said magnetic means has a slender form and is mounted on said stator so as to be nearly in parallel with a rotating shaft of said magnet rotor.

4. A shutter blades drive mechanism for photographic cameras according to any one of claims 1 through 3 wherein said shutter blades opening and closing means is equipped with a latch means to be engaged with said shutter blades opening and closing means in the course of an opening process thereof before said shutter blades are opened, and moved by said driving means so as to disengage said shutter blades opening and closing means when said magnet rotor rotates in the normal direction from the standard position thereof by flowing electric current through said coil.

5. A shutter blades drive mechanism for photographic cameras according to claim 4 wherein an intermediate means is connected to said latch means and said driving means is configured so as to disengage said latch means from said shutter blades opening and closing means through said intermediate means.

* * * * *